(12) United States Patent
Inagaki et al.

(10) Patent No.: US 9,182,866 B2
(45) Date of Patent: Nov. 10, 2015

(54) TOUCH PANEL AND DISPLAY DEVICE

(71) Applicants: Japan Display, Inc., Tokyo (JP); Panasonic Liquid Crystal Display Co., Ltd., Hyogo (JP)

(72) Inventors: Yoshinori Inagaki, Chiba (JP); Shigeyuki Nishitani, Mobara (JP); Kouichi Anno, Mobara (JP)

(73) Assignees: Japan Display, Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 81 days.

(21) Appl. No.: 14/178,410

(22) Filed: Feb. 12, 2014

(65) Prior Publication Data

US 2014/0160072 A1 Jun. 12, 2014

Related U.S. Application Data

(62) Division of application No. 13/090,366, filed on Apr. 20, 2011, now Pat. No. 8,654,090.

(30) Foreign Application Priority Data

Apr. 21, 2010 (JP) ................................. 2010-097491

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01); *G06F 2203/04111* (2013.01)

(58) Field of Classification Search
CPC .......... G06F 3/044; G06F 2203/04111; G06F 2203/04107
USPC ........................................................ 345/174
See application file for complete search history.

(56) References Cited

U.S. PATENT DOCUMENTS

| 5,335,230 A | 8/1994 | Crooks et al. |
| 8,248,382 B2 * | 8/2012 | Muranaka ..................... 345/173 |

(Continued)

FOREIGN PATENT DOCUMENTS

| CN | 101324827 A | 12/2008 |
| CN | 101441545 A | 5/2009 |

(Continued)

OTHER PUBLICATIONS

Partial Translation of the relevant portions of the Office Action of Taiwanese Application No. 100113930 dated Jun. 18, 2014.

*Primary Examiner* — Temesgh Ghebretinsae
*Assistant Examiner* — Michael J Jansen, II
(74) *Attorney, Agent, or Firm* — Lowe Hauptman & Ham, LLP

(57) ABSTRACT

Provided is an electrostatic capacitance type touch panel, wherein lead lines are connected to respective end portions of at least either one of the X electrodes and the Y electrodes respectively, the touch panel further comprises an inspection electrode which is laminated to respective end portions of the at least either one of the X electrodes and the Y electrodes with an insulation film sandwiched therebetween on a side where the lead lines are not connected to the at least either one of the X electrodes and the Y electrodes, and a voltage for inspection is supplied to the inspection electrode during an inspection time and a voltage at the same phase as the drive voltage supplied to the at least either one of the X electrodes and the Y electrodes is supplied to the inspection electrode during a usual operation time.

5 Claims, 10 Drawing Sheets

(56) References Cited

U.S. PATENT DOCUMENTS

| | | |
|---|---|---|
| 2006/0097991 A1 | 5/2006 | Hotelling et al. |
| 2008/0157782 A1 | 7/2008 | Krah |
| 2008/0309633 A1 | 12/2008 | Hotelling et al. |
| 2008/0309635 A1 | 12/2008 | Matsuo |
| 2009/0159344 A1 | 6/2009 | Hotelling et al. |
| 2009/0213090 A1 | 8/2009 | Mamba et al. |
| 2009/0229893 A1* | 9/2009 | Muranaka .................. 178/20.01 |
| 2009/0315854 A1 | 12/2009 | Matsuo |
| 2010/0026661 A1 | 2/2010 | Teramoto |
| 2010/0052700 A1 | 3/2010 | Yano et al. |
| 2010/0123670 A1 | 5/2010 | Philipp |
| 2010/0128000 A1 | 5/2010 | Lo et al. |
| 2010/0289771 A1 | 11/2010 | Nozawa |
| 2011/0007010 A1 | 1/2011 | Chen et al. |
| 2011/0057887 A1 | 3/2011 | Lin et al. |
| 2011/0134052 A1* | 6/2011 | Tsai et al. ..................... 345/173 |

FOREIGN PATENT DOCUMENTS

| | | |
|---|---|---|
| CN | 101639580 A | 2/2010 |
| JP | 2008-310550 | 12/2008 |

* cited by examiner $B > 2 \times A$

TOUCH PANEL AND DISPLAY DEVICE

CROSS-REFERENCE TO RELATED APPLICATION

The present application is a divisional application of Ser. No. 13/090,366, filed Apr. 20, 2011 which claims priority from Japanese application JP 2010-097491 filed on Apr. 21, 2010, the content of which is hereby incorporated by reference into this application.

BACKGROUND OF THE INVENTION

1. Field of the Invention

The present invention relates to a touch panel and a display device, and more particularly to a technique which is effectively applicable in narrowing a width of a picture frame region outside an effective touch region.

2. Description of the Related Art

A display device which is provided with a device for inputting information with a touch operation using a finger of a user or a pen (contact pushing operation, hereinafter simply referred to as "touch") on a display screen (hereinafter also referred to as a touch sensor or a touch panel) is used in a mobile electronic device such as a PDA or a portable terminal, various household appliances, an automated teller machine and the like.

As such a touch panel, a resistance-film type touch panel in which a change in a resistance value of a touched portion is detected, an electrostatic-capacitance type touch panel in which a change in capacitance is detected, an optical-sensor type touch panel in which a change in quantity of light is detected and the like are known.

The electrostatic-capacitance type touch panel has the following advantages compared with the resistance-film type touch panel and the optical-sensor type touch panel. For example, the electrostatic-capacitance type touch panel is advantageous with respect to a point that transmissivity is high, that is, approximately 90% thus preventing the lowering of quality of a display image compared to the resistance-film type touch panel and the optical-sensor type touch panel where transmissivity is low, that is, approximately 80%. Further, although the resistance-film type touch panel detects a touch position in response to a mechanical contact with a resistance film and hence, there exists a possibility that the resistance film is deteriorated or broken, there is no mechanical contact which brings an electrode for detection into contact with other electrode or the like in the electrostatic-capacitance type touch panel and hence, the electrostatic-capacitance type touch panel is advantageous also from a viewpoint of durability.

As the electrostatic-capacitance type touch panel, for example, there has been known a touch panel of this type disclosed in JP 2008-310550 A. In the touch panel of this type disclosed in the patent document, the touch panel is provided with electrodes arranged in the longitudinal direction for detection (hereinafter referred to as X electrodes) and electrodes arranged in the lateral direction for detection (hereinafter referred to as Y electrodes) which are arranged in a matrix array in two dimensional directions consisting of the longitudinal direction and the lateral direction, and an input processing part which detects a capacitance of each electrode. When a conductive body such as a finger is brought into contact with a surface of the touch panel, the capacitance of each electrode is increased and hence, the input processing part detects the increase of the capacitance, and calculates input coordinates based on a signal indicative of a change in capacitance detected by each electrode.

In the electrostatic-capacitance type touch panel disclosed in JP 2008-310550 A, lines are led out from one side of the Y electrodes (hereinafter these lines being referred to as lead lines), and the lead lines are connected to terminals which are connected to a flexible printed circuit board so that a drive voltage is supplied to the Y electrodes from one side of the Y electrodes. The touch panel adopting such a method is referred to as a touch panel of one-sided feeding type.

In this touch panel of one-sided feeding type, when disconnection or increase of resistance occurs in the X electrode, in the Y electrode or the lead lines of these electrodes, there has been a drawback that an inspection of the disconnection or the increase of resistance with respect to a panel unit body is difficult.

SUMMARY OF THE INVENTION

The present invention has been made to overcome the above-mentioned problems of the related art, and it is an object of the present invention to provide a technique which can detect disconnection or increase of resistance of an electrode for detection in a touch panel where electricity is supplied from one side of electrodes for detection.

The above-mentioned and other objects and novel technical features of the present invention will become apparent from the description of this specification and attached drawings.

To briefly explain the summery of representative inventions among the inventions described in this specification, there are as follows.

According to one aspect of the present invention, there is provided an electrostatic capacitance type touch panel which includes: a substrate; a plurality of X electrodes which are formed over the substrate, the plurality of X electrodes extending in a second direction and being arranged in a first direction which intersects with the second direction; and a plurality of Y electrodes which are formed over the substrate, the plurality of Y electrodes extending in the first direction while intersecting the X electrodes and being arranged in the second direction; a drive voltage being supplied to the plurality of Y electrodes from one side of the plurality of Y electrodes, wherein lead lines are connected to respective end portions of at least either one of the X electrodes and the Y electrodes respectively, the touch panel further includes an inspection electrode which is laminated to respective end portions of the at least either one of the X electrodes and the Y electrodes with an insulation film sandwiched therebetween on a side where the lead lines are not connected to the at least either one of the X electrodes and the Y electrodes, and a voltage for inspection is supplied to the inspection electrode during an inspection time and a voltage at the same phase as the drive voltage supplied to the at least either one of the X electrodes and the Y electrodes is supplied to the inspection electrode during a usual operation time.

According to another aspect of the present invention, there is provided an electrostatic capacitance type touch panel which includes: a substrate; a plurality of X electrodes which are formed over the substrate, the plurality of X electrodes extending in a second direction and being arranged in a first direction which intersects with the second direction; and a plurality of Y electrodes which are formed over the substrate, the plurality of Y electrodes extending in the first direction while intersecting the X electrodes and being arranged in the second direction; a drive voltage being supplied to the plurality of Y electrodes from one side of the plurality of Y electrodes, wherein lead lines are connected to respective end portions of at least either one of the X electrodes and the Y electrodes respectively, the at least either one of the X electrodes and the Y electrodes is divided into first and second groups, and the lead lines which are connected to the respective end portions of the at least either one of the X electrodes and the Y electrodes in the first group and the lead lines which are connected to the respective end portions of the at least either one of the X electrodes and the Y electrodes in the second group are led out in directions different from each other, the touch panel further includes a first inspection electrode which is laminated to respective end portions of the at least either one of the X electrodes and the Y electrodes in the first group on a side where the lead lines are not connected to the at least either one of the X electrodes and the Y electrodes with an insulation film sandwiched therebetween, and a second inspection electrode which is laminated to respective end portions of the at least either one of the X electrodes and the Y electrodes in the second group on a side where the lead lines are not connected to the at least either one of the X electrodes and the Y electrodes with an insulation film sandwiched therebetween, and a voltage for inspection is supplied to the first inspection electrode and the second inspection electrode during an inspection time and a voltage at the same phase as the drive voltage supplied to the Y electrodes is supplied to the first inspection electrode and the second inspection electrode during a usual operation time.

To briefly explain advantageous effects acquired by the representative inventions among the inventions described in this specification, it is as follows.

According to the present invention, disconnection or increase of resistance of an electrode for detection can be detected in a touch panel where electricity is supplied from one side of electrodes for detection.

DETAILED DESCRIPTION OF THE INVENTION

Embodiments of the present invention are explained in detail in conjunction with drawings hereinafter.

In all drawings for explaining the embodiments, parts having identical functions are given same symbols, and the repeated explanation of these parts is omitted. Further, the embodiments explained hereinafter are not used for limiting the interpretation of claims of the present invention.

Embodiment 1

Figure 1:
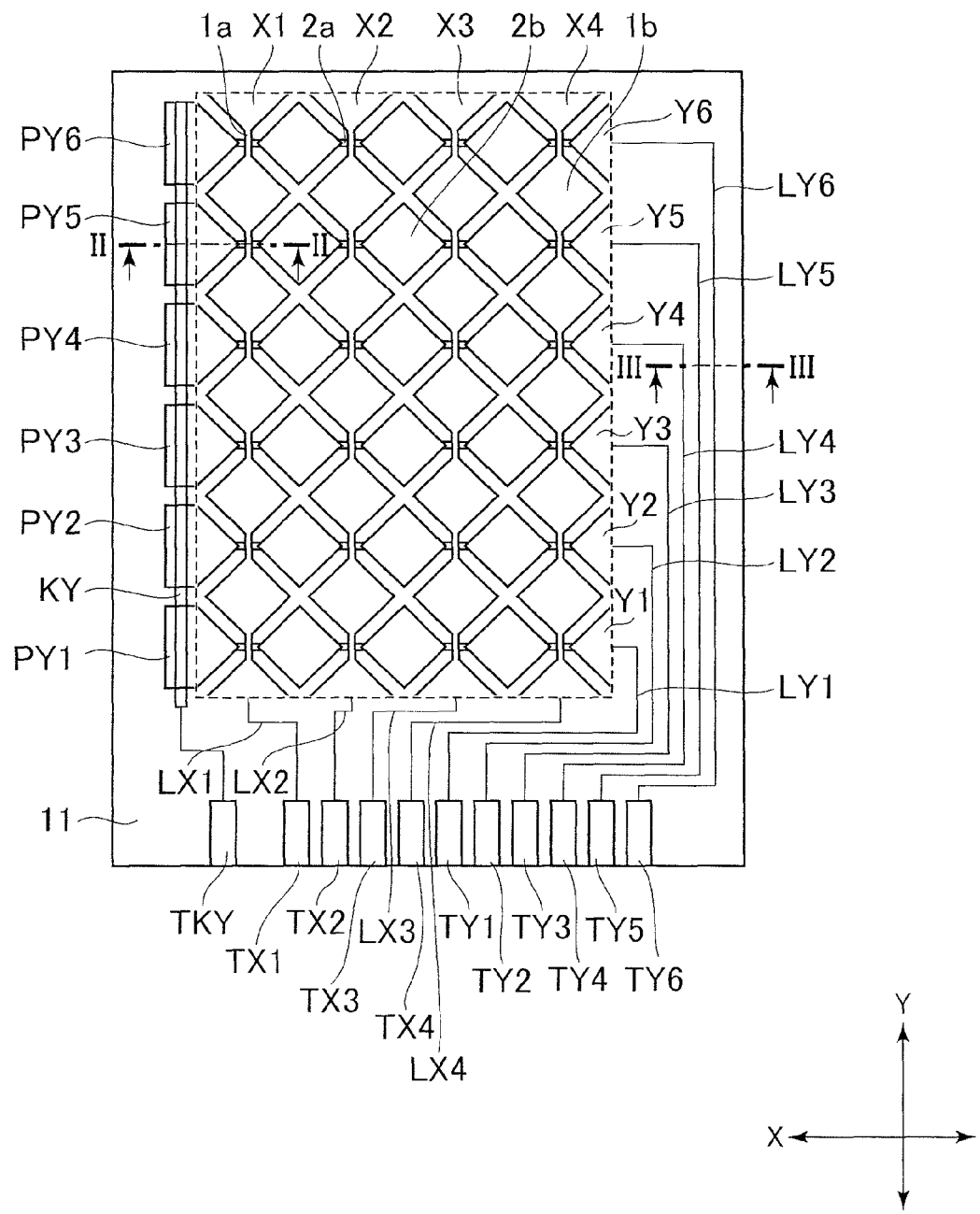
FIG. 1 is a view for explaining a touch panel according to an embodiment 1 of the present invention.
Figure 2:
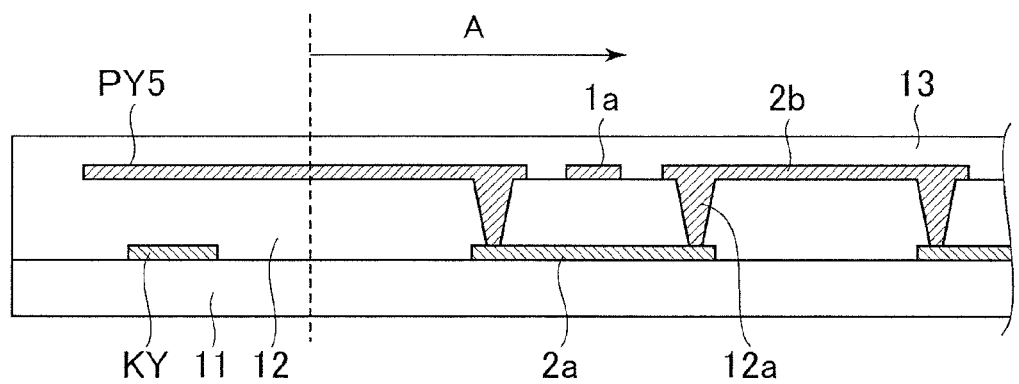
FIG. 2 is a cross-sectional view of an essential part showing the cross-sectional structure of the touch panel taken along a line II-II in FIG. 1.
Figure 3:
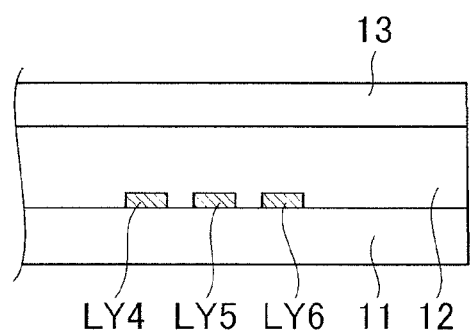
FIG. 3 is a cross-sectional view of an essential part showing the cross-sectional structure of the touch panel taken along a line III-III in FIG. 1.

FIG. 1 is a view for explaining a touch panel according to the embodiment 1 of the present invention, FIG. 2 is a cross-sectional view of an essential part showing the cross-sectional structure taken along a line II-II in FIG. 1, and FIG. 3 is a cross-sectional view of an essential part showing the cross-sectional structure taken along a line III-III in FIG. 1.

As shown in FIG. 1, the touch panel of this embodiment includes a plurality of X electrodes (X1 to X4) which extend in a second direction (Y direction) and are arranged parallel to each other in a first direction (X direction) which intersects with the second direction at a predetermined arrangement pitch, and a plurality of Y electrodes (Y1 to Y6) which extend in the first direction intersecting with the X electrodes and are arranged parallel to each other in the second direction at a predetermined arrangement pitch. A portion indicated by a dotted frame in FIG. 1 indicates an effective touch region.

Each one of the plurality of X electrodes has an electrode pattern in which a fine line portion 1a and a pad portion 1b having a width larger than a width of the fine line portion 1a are arranged alternately in the second direction.

As shown in FIG. 2 and FIG. 3, the plurality of X electrodes are arranged on an insulation film 12, and a protective film 13 is formed over the plurality of X electrodes.

Each Y electrode has an electrode pattern in which a fine line portion 2a and a pad portion 2b having a width larger than a width of the fine line portion 2a are arranged alternately in the first direction in plural number.

As viewed in a plan view, the pad portions 1b of each X electrode and the pad portions 2b of each Y electrode are arranged not to overlap with each other, and the fine line portion 1a of each X electrode and the fine line portion 2a of each Y electrode intersect with each other.

As shown in FIG. 2 and FIG. 3, the respective fine line portions 2a of the plurality of Y electrodes are formed over a layer different from a layer on which the fine line portions 1a and the pad portions 1b of the X electrodes are formed, and the fine line portions 2a of the Y electrodes intersect with the fine line portions 1a of the X electrodes as viewed in a plan view. The respective pad portions 2b of the plurality of Y electrodes are formed over the same layer as the fine line portions 1a and the pad portions 1b of the X electrodes in a separated manner from the pad portions 1b of the X electrodes. In this embodiment, the fine line portions 1a of the X electrodes are formed above the fine line portions 2a of the Y electrodes.

The respective pad portions 2b of the plurality of Y electrodes are covered with the protective film 13. The fine line portion 2a of the Y electrode is formed over a substrate 11, and the fine line portion 2a of the Y electrode is electrically connected with two pad portions 2b arranged adjacent to each other with the fine line portion 2a sandwiched therebetween via a contact hole 12a formed in the insulation film 12. A transparent insulating substrate made of glass or the like, for example, is used as the substrate 11. The X electrodes and the Y electrodes are formed using a material which possesses high transmissivity, for example, a transparent conductive material such as ITO (Indium Tin Oxide), for example.

The touch panel of this embodiment is also a touch panel of a one-sided feeding type. As shown in FIG. 1, the X electrodes are constituted of four X electrodes X1 to X4, the respective X electrodes are connected to lead lines (LX1 to LX4), and the lead lines (LX1 to LX4) are connected to respective terminal portions (TX1 to TX4) formed on one side of the substrate 11.

The Y electrodes are constituted of six Y electrodes Y1 to Y6, one-end portions of the respective Y electrodes are connected to lead lines (LY1 to LY6), and the lead lines (LY1 to LY6) are connected to respective terminal portions (TY1 to TY6) formed over one side of the substrate 11. Further, the other-end portions of the Y electrodes are respectively connected to inspection portions (PY1 to PY6). The lead lines (LX1 to LX4, LY1 to LY6) and the inspection portions (PY1 to PY6) are formed in regions outside the effective touch region (a region indicated by an arrow A in FIG. 2), and are formed of a metal layer such as a silver alloy film.

As shown in FIG. 1, in this embodiment, the inspection portions (PY1 to PY6) are formed in a region on a side opposite to the region where the lead lines (LY1 to LY6) of the Y electrodes are formed. An inspection electrode KY is formed over a lower side of the inspection portions (PY1 to PY6). The inspection electrode KY is connected to a terminal portion TKY which is formed on one side of the substrate 11.

In this manner, according to this embodiment, the inspection portions (PY1 to PY6) and the inspection electrode KY are arranged to face each other with the insulation film 12 sandwiched therebetween. That is, capacitance is generated between the inspection electrode KY and the inspection portions (PY1 to PY6).

The inspection portions (PY1 to PY6) are formed over the same layer as the fine line portions 1a and the pad portions 1b of the X electrodes and the pad portions 2b of the Y electrodes, and are formed of a transparent conductive film such as ITO in the same manner as the X electrodes and the Y electrodes.

The inspection electrode KY is formed over the substrate 11 using a transparent conductive material such as ITO (Indium Tin Oxide), for example, or is formed of a metal layer such as a silver alloy film, for example.

In the touch panel, to allow the detection of a change in capacitance of each electrode by a finger touch, it is necessary that the X electrodes and the Y electrodes are surely connected to the terminal portions formed on one side of the substrate by the respective lead lines. When a disconnection or increase of resistance exists on a certain electrode or in the midst of a certain lead line, the detection of capacitance by the finger touch cannot be performed.

In this embodiment, at the time of manufacturing a product, a voltage having a rectangular waveform is inputted to the inspection electrode KY from the terminal portion TKY. Then, the voltage having a rectangular waveform inputted to the inspection electrode KY is inputted to the respective Y electrodes (Y1 to Y6) via capacitances generated between the inspection electrode KY and the inspection portions (PY1 to PY6). By observing the voltages having a rectangular waveform inputted to the Y electrodes (Y1 to Y6) at the respective terminal portions (TY1 to TY6), a disconnection or increase of resistance in the Y electrodes (Y1 to Y6) and the lead lines (LY1 to LY6) can be detected.

Accordingly, in this embodiment, at the time of manufacturing a product, a disconnection or increase of resistance of the Y electrodes (Y1 to Y6) and the lead lines (LY1 to LY6) can be detected, and a touch panel in which the disconnection or the increase of resistance is recognized can be excluded as a defective product thus realizing touch panels which exhibit a high yield at the time of manufacturing products.

In a usual operation, a voltage equal to a drive voltage supplied to the Y electrodes (Y1 to Y6) is supplied to the inspection electrode KY. Accordingly, capacitive coupling between the inspection portions (PY1 to PY6) and the inspection electrode KY can be suppressed.

For example, when a user touches a surface of the touch panel on the Y electrode Y6 with his finger, a change in capacitance is generated on the Y electrode Y6 by the finger touch. A touch panel controller detects this change in capacitance, and determines that the finger touch is made on the Y electrode Y6.

In such a case, assuming that a cross talk is generated between the Y electrode Y6 and the Y electrode Y5 via the inspection electrode KY, the touch panel controller detects that a capacitance on the Y electrode Y5 is also slightly changed. Accordingly, the touch panel controller erroneously determines that the finger touch is made between the Y electrode Y5 and the Y electrode Y6.

In this manner, when the cross talk is generated, the touch panel controller determines a position displaced from a position at which the finger touch is made and hence, the accuracy in position determination is deteriorated.

Accordingly, by supplying a voltage equal to a drive voltage supplied to the Y electrodes (Y1 to Y6) to the inspection electrode KY, capacitive coupling between the inspection portions (PY1 to PY6) and the inspection electrode KY can be canceled in appearance and hence, the above-mentioned cross talk can be suppressed whereby the touch panel which exhibits high accuracy in position determination can be realized.

[Touch Panel According to Modification of Embodiment 1]

Figure 4:
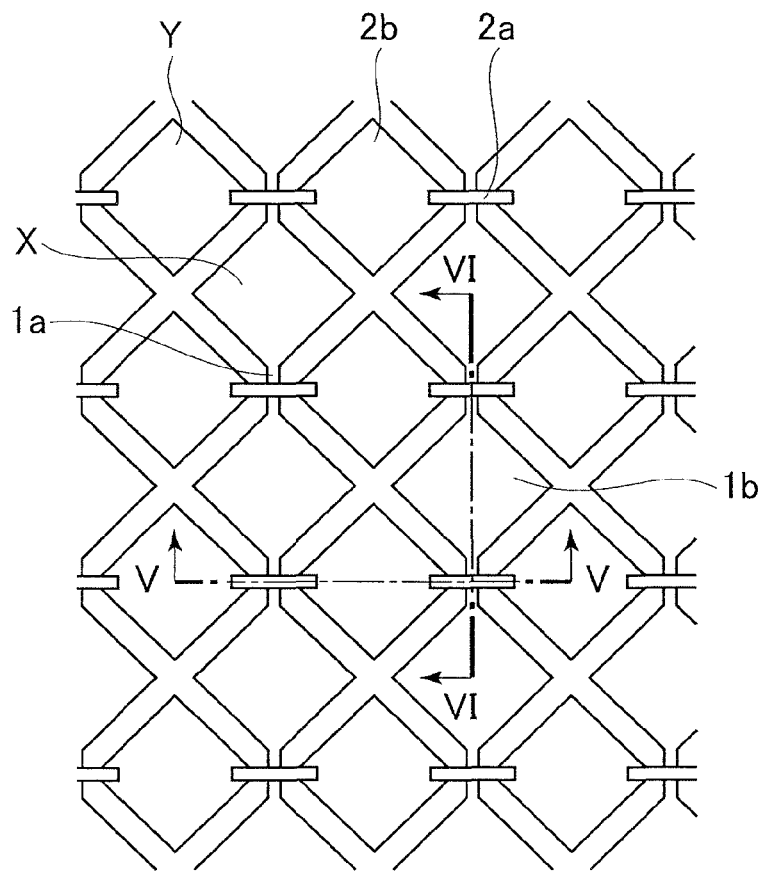
FIG. 4 is a view for explaining a touch panel according to a modification of the embodiment 1 of the present invention.
Figure 5:
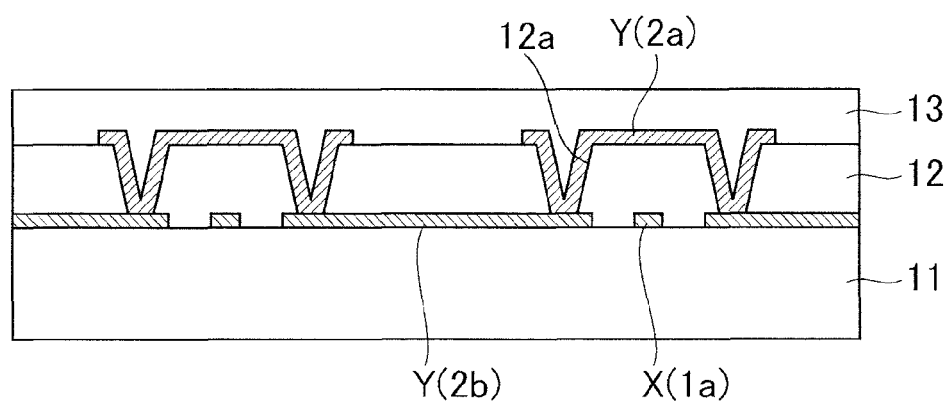
FIG. 5 is a cross-sectional view of an essential part showing the cross-sectional structure of the touch panel taken along a line V-V in FIG. 4.
Figure 6:
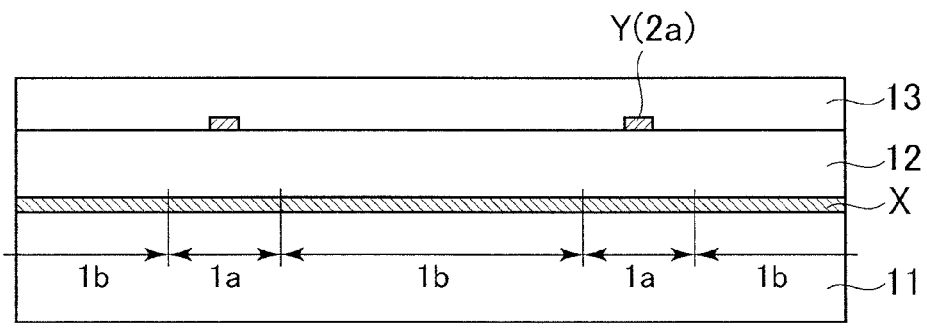
FIG. 6 is a cross-sectional view of an essential part showing the cross-sectional structure of the touch panel taken along a line VI-VI in FIG. 4.

FIG. 4 is a view for explaining a touch panel according to a modification of the embodiment 1 of the present invention, FIG. 5 is a cross-sectional view of an essential part showing the cross-sectional structure taken along a line V-V in FIG. 4, and FIG. 6 is a cross-sectional view of an essential part showing the cross-sectional structure taken along a line VI-VI in FIG. 4.

In the touch panel shown in FIG. 4 to FIG. 6, as viewed in a plan view, pad portions 1b of respective X electrodes and pad portions 2b of respective Y electrodes are arranged without overlapping with each other, and fine line portions 1a of the respective X electrodes and fine line portions 2a of the respective Y electrodes intersect with each other.

The fine line portions 2a of the plurality of Y electrodes and the fine line portions 1a and the pad portions 1b of the plurality of X electrodes are formed over layers different from each other. The pad portions 2b of the plurality of Y electrodes are formed over the same layer as the fine line portions 1a and the pad portions 1b of the X electrodes, but are formed separate from the pad portions 1b of the X electrodes. The fine line portions 1a and the pad portions 1b of the plurality of X electrodes, and the pad portions 2b of the plurality of Y electrodes are formed over a substrate 11 and are covered with an insulation film 12.

The fine line portions 2a of the plurality of Y electrodes are formed over the insulation film 12 formed above the fine line portions 1a of the X electrodes, and each fine line portion 2a of the plurality of Y electrodes is electrically connected with two pad portions 2b arranged adjacent to each other with the fine line portion 2a sandwiched therebetween via a contact hole 12a formed in the insulation film 12. The respective fine line portions 2a of the plurality of Y electrodes are covered with a protective film 13.

In the touch panel shown in FIG. 4 to FIG. 6, the Y electrodes are formed over the substrate 11. Accordingly, inspection portions (PY1 to PY6) are also formed over the substrate 11 and hence, an inspection electrode KY is formed over the insulation film 12 in the same manner as the fine line portions 2a of the plurality of Y electrodes.

Also in the touch panel shown in FIG. 4 to FIG. 6, the inspection portions (PY1 to PY6), the X electrodes and the Y electrodes are formed using a transparent conductive film such as ITO. Further, the inspection electrode KY is formed using a transparent conductive material such as Indium Tin Oxide (ITO), for example, or is formed of a metal layer such as a silver alloy film, for example.

Embodiment 2

Figure 7:
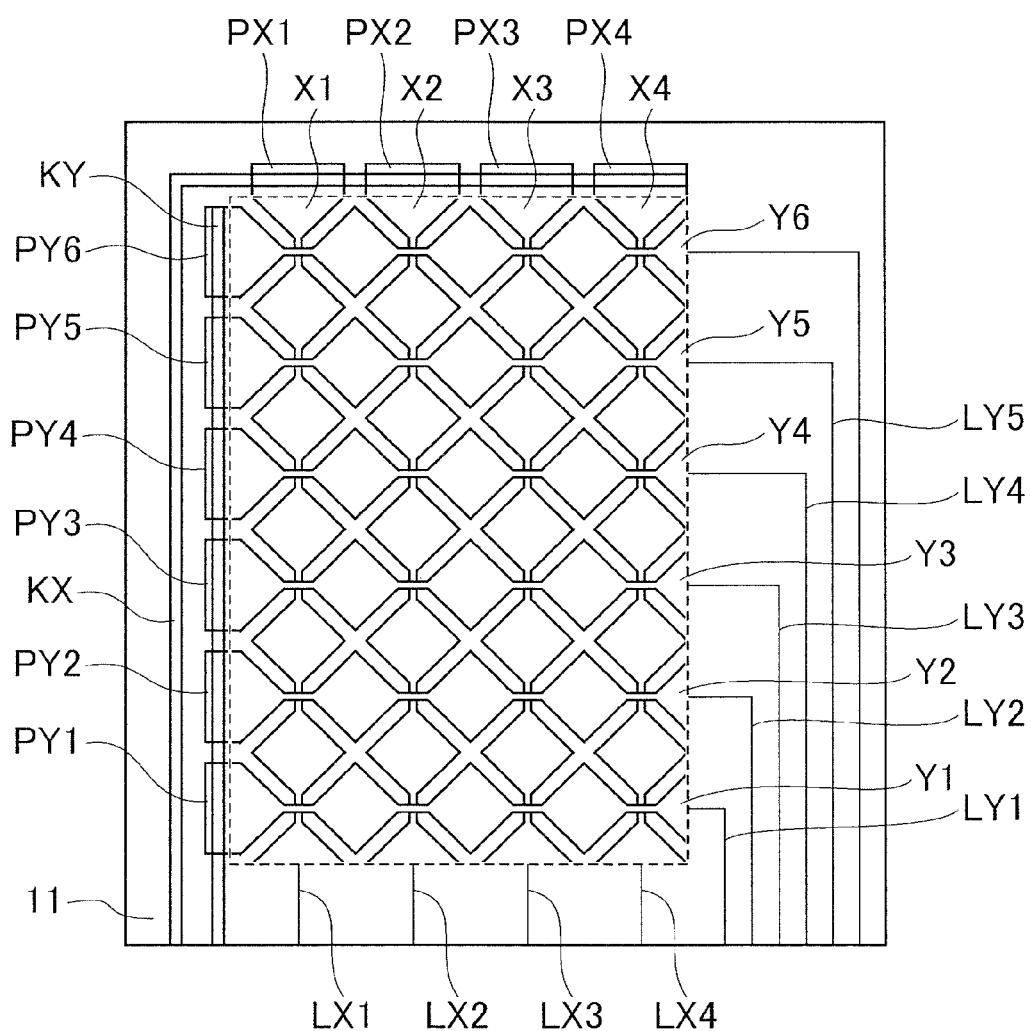
FIG. 7 is a view for explaining a touch panel according to an embodiment 2 of the present invention.

FIG. 7 is a view for explaining a touch panel according to an embodiment 2 of the present invention.

This embodiment is characterized that inspection portions (PX1 to PX4) are also formed over X electrodes X1 to X4, and an inspection electrode KX is formed in such a manner that an insulation layer is sandwiched between the inspection electrode KX and the inspection portions (PX1 to PX4). The inspection electrode KX is connected to a terminal portion (not shown in the drawing) which is formed on one side of a substrate 11. That is, this embodiment is provided for detecting a disconnection or increase of resistance of the X electrodes (X1 to X4) and lead lines (LX1 to LX4).

Also in this embodiment, the inspection portions (PX1 to PX4) are formed over the same layer as fine line portions 1a and pad portions 1b of the X electrodes and pad portions 2b of Y electrodes in an effective touch region, and are formed of a transparent conductive film such as ITO in the same manner as the X electrodes and the Y electrodes.

The inspection electrode KX is formed using a transparent conductive material such as ITO (Indium Tin Oxide), for example, or is formed of a metal layer such as a silver alloy film, for example.

When the structure of the touch panel of this embodiment adopts the structure shown in FIG. 1 to FIG. 3, the inspection portions (PX1 to PX4) are arranged on an insulation film 12, and the inspection electrode KX is formed over the substrate 11. Further, when the structure of the touch panel according to this embodiment adopts the structure shown in FIG. 4 to FIG. 6, the inspection portions (PX1 to PX4) are formed over the substrate 11 and the inspection electrode KX is formed over the insulation film 12.

At the time of manufacturing a product, a voltage having a rectangular waveform is inputted to the inspection electrode KX from a terminal portion TKX. Then, the voltage having a rectangular waveform inputted to the inspection electrode KX is inputted to the respective X electrodes (X1 to X4) via capacitances generated between the inspection electrode KX and the inspection portions (PX1 to PX4). By observing the voltages having a rectangular waveform inputted to the X electrodes (X1 to X4) at respective terminal portions (TX1 to TX4), a disconnection or increase of resistance in the X electrodes (X1 to X4) and the lead lines (LX1 to LX4) can be detected.

Accordingly, also in this embodiment, at the time of manufacturing a product, the disconnection or the increase of resistance of the X electrodes (X1 to X4) and the lead lines (LX1 to LX4) and the disconnection or the increase of resistance of the Y electrodes (Y1 to Y6) and lead lines (LY1 to LY6) can be detected, and a touch panel in which the disconnection or the increase of resistance is recognized can be excluded as a defective product thus realizing touch panels which exhibit a high yield at the time of manufacturing products.

In a usual operation, a voltage equal to a drive voltage supplied to the X electrodes (X1 to X4) is supplied to the inspection electrode KX. Accordingly, capacitive coupling between the inspection portions (PX1 to PX4) and the inspection electrode KY can be suppressed.

[Another Example of Specific Electrode Structure of Touch Panel According to Embodiment 2]

Figure 8:
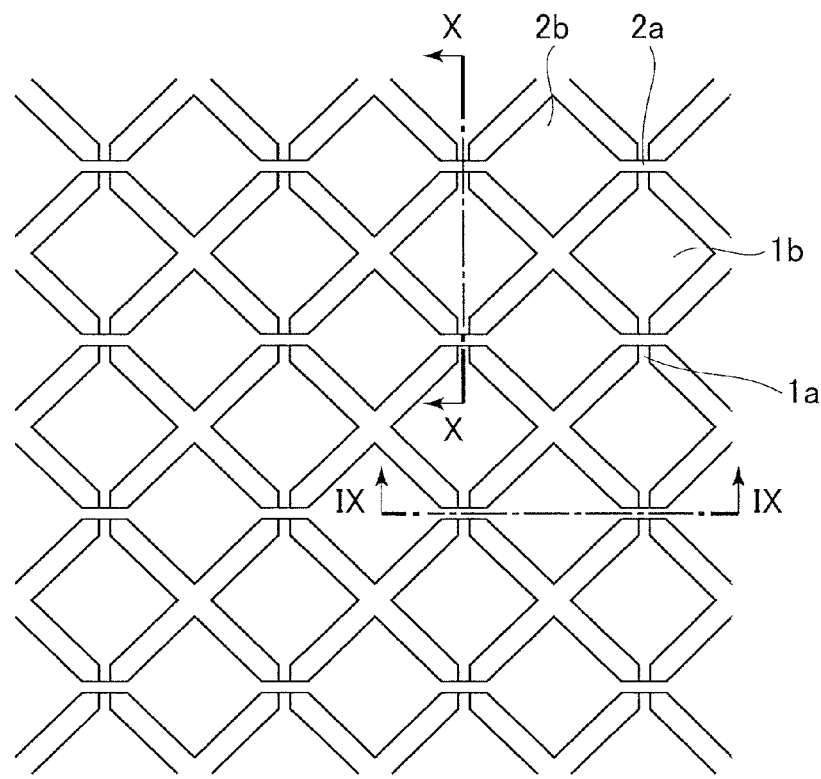
FIG. 8 is a view for explaining a touch panel according to a modification of the embodiment 2 of the present invention.
Figure 9:
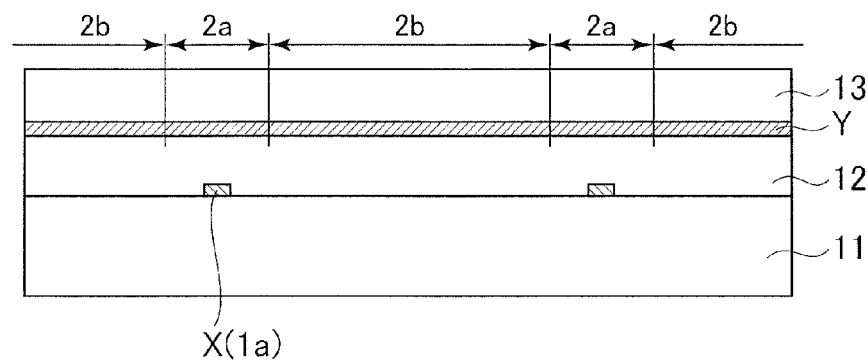
FIG. 9 is a cross-sectional view of an essential part showing the cross-sectional structure of the touch panel taken along a line IX-IX in FIG. 8.
Figure 10:
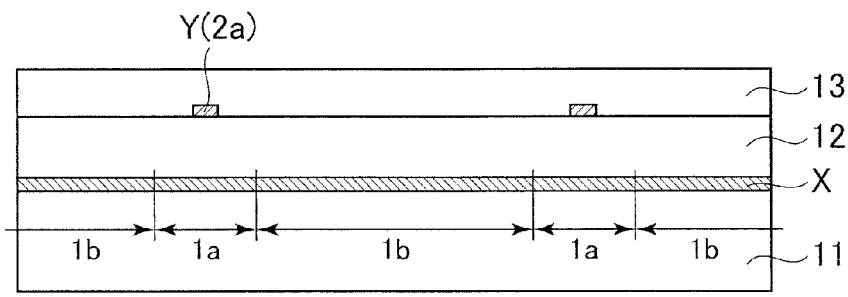
FIG. 10 is a cross-sectional view of an essential part showing the cross-sectional structure of the touch panel taken along a line X-X in FIG. 8.

FIG. 8 is a view for explaining a touch panel according to a modification of the embodiment 2 of the present invention, FIG. 9 is a cross-sectional view of an essential part showing the cross-sectional structure taken along a line IX-IX in FIG. 8, and FIG. 10 is a cross-sectional view of an essential part showing the cross-sectional structure taken along a line X-X in FIG. 8.

Also in the touch panel shown in FIG. 8 to FIG. 10, as viewed in a plan view, pad portions 1b of respective X electrodes and pad portions 2b of respective Y electrodes are arranged without overlapping with each other, and fine line portions 1a of the respective X electrodes and fine line portions 2a of the respective Y electrodes intersect with each other.

The touch panel shown in FIG. 8 to FIG. 10 is characterized in that the X electrodes and the Y electrodes are formed over different layers with an insulation film 12 sandwiched therebetween as shown in FIG. 8 to FIG. 10, wherein the X electrodes are formed below the Y electrodes and are formed over a viewer's side surface of a glass substrate 11.

In the touch panel shown in FIG. 8 to FIG. 10, inspection portions (PX1 to PX4) on an X electrode side are formed over the substrate 11, and inspection portions (PY1 to PY6) on a Y electrode side are formed over the insulation film 12. Accordingly, inspection electrodes KX, KY may be formed over an intermediate layer between the X electrodes and the Y electrodes.

Embodiment 3

Figure 11:
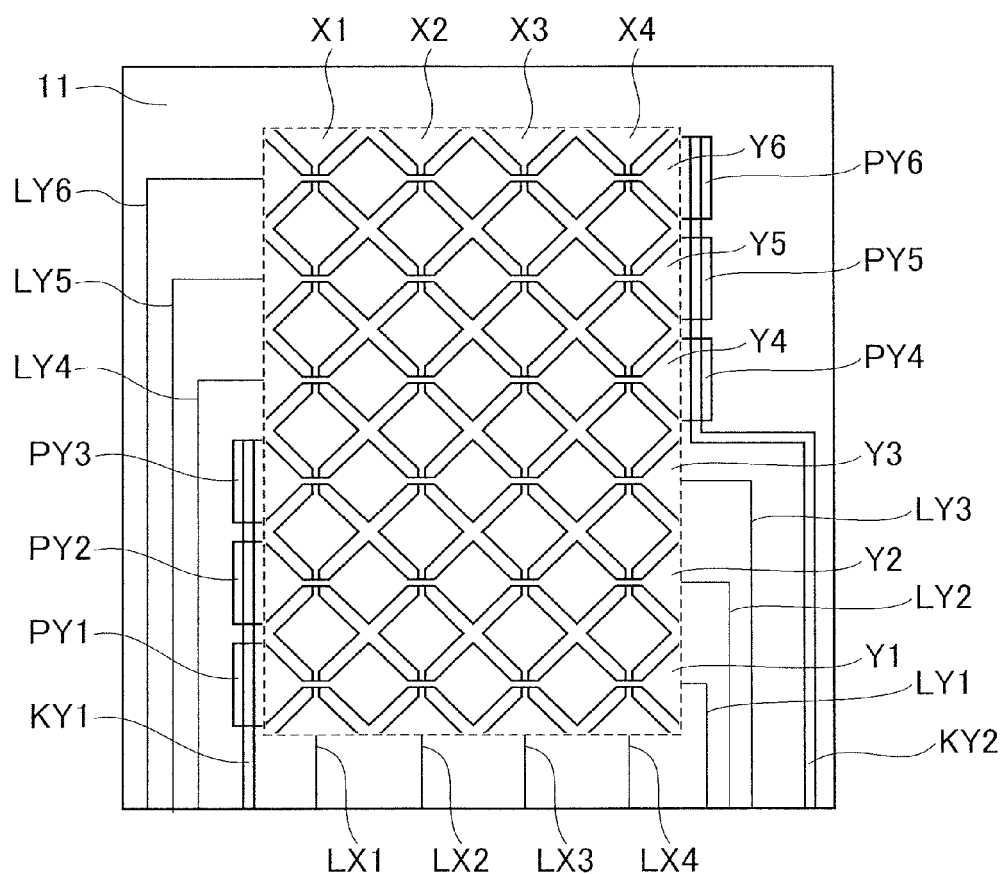
FIG. 11 is a view for explaining a touch panel according to an embodiment 3 of the present invention.

FIG. 11 is a view for explaining a touch panel according to an embodiment 3 of the present invention.

This embodiment is characterized in that, in the touch panel of the above-mentioned embodiment 1, the Y electrodes Y1 to Y6 are divided into two groups of Y electrodes, that is, the Y electrodes Y1 to Y3 and the Y electrodes Y4 to Y6, and the lead lines (LY1 to LY3) for the Y electrodes Y1 to Y3 and the lead lines (LY4 to LY6) for the Y electrodes Y4 to Y6 are led out from sides opposite to each other. Accordingly, in this embodiment, the inspection electrode KY is also divided into two inspection electrodes KY1, KY2. In this embodiment, a width of a picture frame region of an effective touch region can be set uniform between left and right sides.

In this embodiment, the X electrodes may be also divided into two groups of X electrodes and two inspection electrodes KX may be provided for the divided groups of X electrodes respectively.

In this embodiment, it is desirable that the inspection electrodes (KX, KY) are formed between a layer on which the Y electrodes are formed and a layer on which the X electrodes are formed.

Embodiment 4

Figure 12:
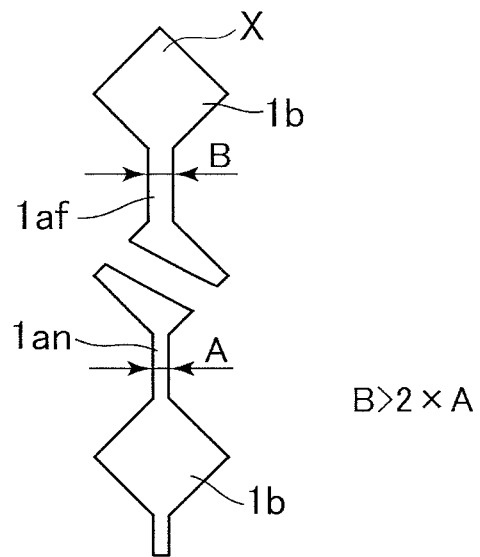
FIG. 12 is a view for explaining an X electrode of a touch panel according to an embodiment 4 of the present invention.

FIG. 12 is a view for explaining an X electrode of a touch panel according to an embodiment 4 of the present invention. The electrostatic-capacitance type touch panel determines the presence or the non-presence of a finger touch based on a change in capacitance of an X electrode or a Y electrode by a finger touch. Sensitivity in such an operation is influenced by capacitances and resistances of the X electrode and the Y electrode per se. That is, when the capacitances are large, it is impossible to grasp a change in capacitance when a user touches the touch panel. When the resistances are large, the electrodes (X electrode and Y electrode) cannot be charged sufficiently and hence, a response value for the finger touch becomes small so that sensitivity is lowered.

Further, when the reaction value in response to the finger touch fluctuates within the effective touch region, a region where sensitivity is insufficient is formed partially and such a region adversely influences a manipulation. Particularly, in a touch panel of a one-sided feeding type, a line length of electrodes which are arranged parallel to a long side of the touch panel (X electrodes in this embodiment) is large and hence, there may be a case where a load is increased at a remote end remote from a feeding end thus giving rise to the above-mentioned phenomenon.

In view of the above, according to this embodiment, to eliminate the difference in the reaction value in response to the finger touch between a near end and the remote end, by focusing on a fine line portion 1a which connects the electrodes and is largely relevant to a resistance value, as shown in FIG. 12, a width of the fine line portion 1a is increased along with the increase of a distance from the feeding end such that a width of a fine line portion 1af at the remotest end is set twice or more as large as a width of a fine line portion tan at the nearest end near the feeding end (B≥2×A in FIG. 12). Accordingly, the reaction value in response to the finger touch can be made uniform between a remote end side remote from the feeding end and a near end side near the feeding end.

In the above-mentioned embodiment, the width of the fine line portion 1a is increased along with the increase of the distance from the feeding end such that the width of the fine line portion 1a at the remotest end is set twice or more as large as the width of the fine line portion tan at the nearest end near the feeding end (B≥2×A in FIG. 12) with respect to the fine line portion 1a of the X electrode. However, also with respect to a fine line portion 2a of the Y electrode, a width of the fine line portion 2a may be increased along with the increase of a distance from a feeding end such that a width of the fine line portion 2a at the remotest end is set twice as large as a width of the fine line portion 2a at the nearest end near the feeding end.

Embodiment 5

Figure 13:
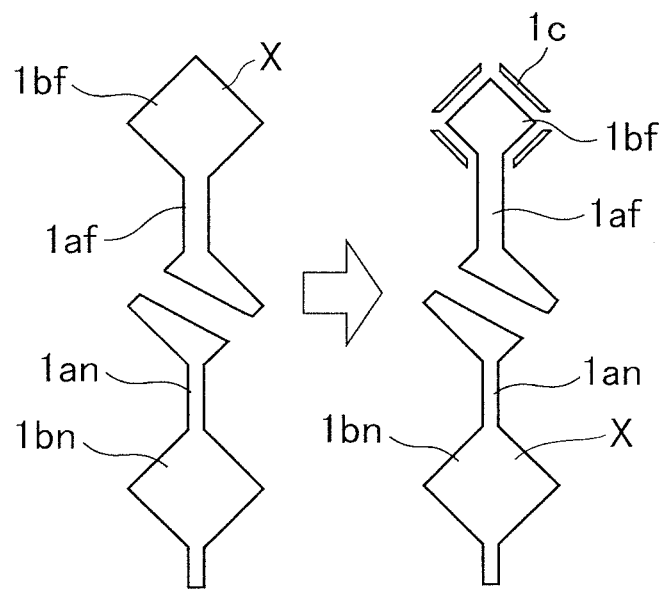
FIG. 13 is a view for explaining an X electrode of a touch panel according to an embodiment 5 of the present invention.

FIG. 13 is a view for explaining an X electrode of a touch panel according to an embodiment 5 of the present invention.

In this embodiment, as shown in FIG. 13, in the X electrode, compared to a size (or an area) of a pad portion 1bn on a near end side nearest to a feeding end, a size (or an area) of a pad portion 1bf on a remote end side remotest from the feeding end is set small, and floating electrodes 1c are added to the pad portion 1bf.

Due to such a constitution, a charge time can be shortened and an inter-electrode capacitance can be decreased and hence, a reaction value of the pad portion 1bf remotest from the feeding end in response to a touch on the X electrode can be enhanced.

In the above-mentioned embodiment, the size (or the area) of the pad portion 1bf on the remote end side from the feeding end is set small and the floating electrodes 1c are added to the pad portion 1bf with respect to the X electrode. However, a size (or an area) of a pad portion 2b on a remote end side remote from a feeding end may be set small and floating electrodes 1c may be added to the pad portion 2b with respect to a Y electrode.

Although the size (or the area) of a pad portion 1b (or the pad portion 2b) on the remote end side remotest from the feeding end is set small and the floating electrodes 1c are added to the pad portion 1b (or the pad portion 2b) with respect to the X electrode (or the Y electrode) in this embodiment, a plurality of pad portions 1b (or pad portions 2b) on the remote end side remote from the feeding end may be set small in size (or area) and the floating electrodes 1c may be added to the pad portions 1b (or the pad portions 2b) in the X electrode (or the Y electrode). In this case, the number of the pad portions 1b (or the pad portions 2b) whose size (or area) is decreased and to which the floating electrodes 1c are added may be set such that a reaction value in response to a finger touch can be made uniform in the X electrode (or the Y electrode). Further, sizes (or areas) of the pad portions 1b (or the pad portions 2b) of the X electrode (or the Y electrode) may be gradually decreased along with the increase of a distance from the feeding end, and sizes (or areas) of the floating electrodes 1c may be gradually increased along with the increase of the distance from the feeding end.

Further, by adding the constitution of this embodiment to the constitution of the previously-mentioned embodiment 4, a reaction value of the pad portion 1bf remotest from the feeding end in response to a touch can be enhanced. FIG. 13 shows such a constitution.

Embodiment 6

Figure 14:
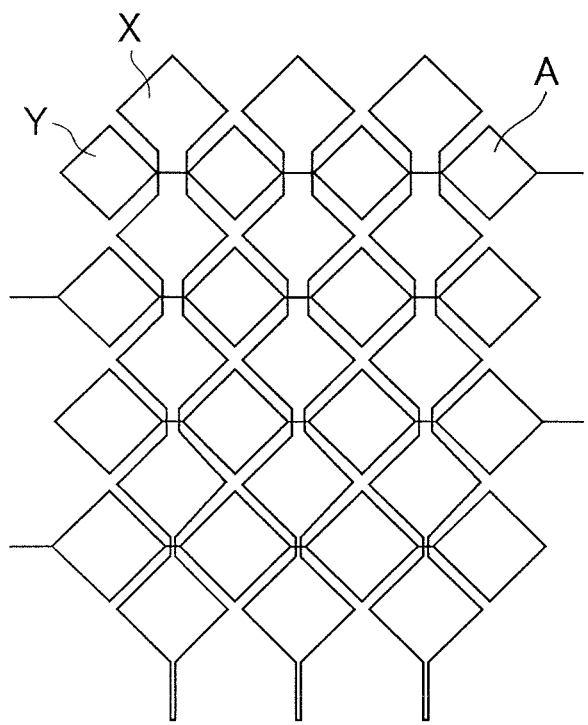
FIG. 14 is a view for explaining a drawback of the touch panel according to the embodiment 4 of the present invention.

In the electrode structure of the previously-mentioned embodiment 4, the width of the fine line portion 1a of the X electrode is increased along with the increase of the distance from the feeding end. Accordingly, as shown in FIG. 14, an area of the pad portion 2b of the Y electrode having the fine line portion 2a which intersects with the fine line portion 1a of the X electrode remotest from the feeding end is also decreased. FIG. 14 is a view for explaining a drawback of the touch panel according to the embodiment 4 of the present invention.

Figure 15:
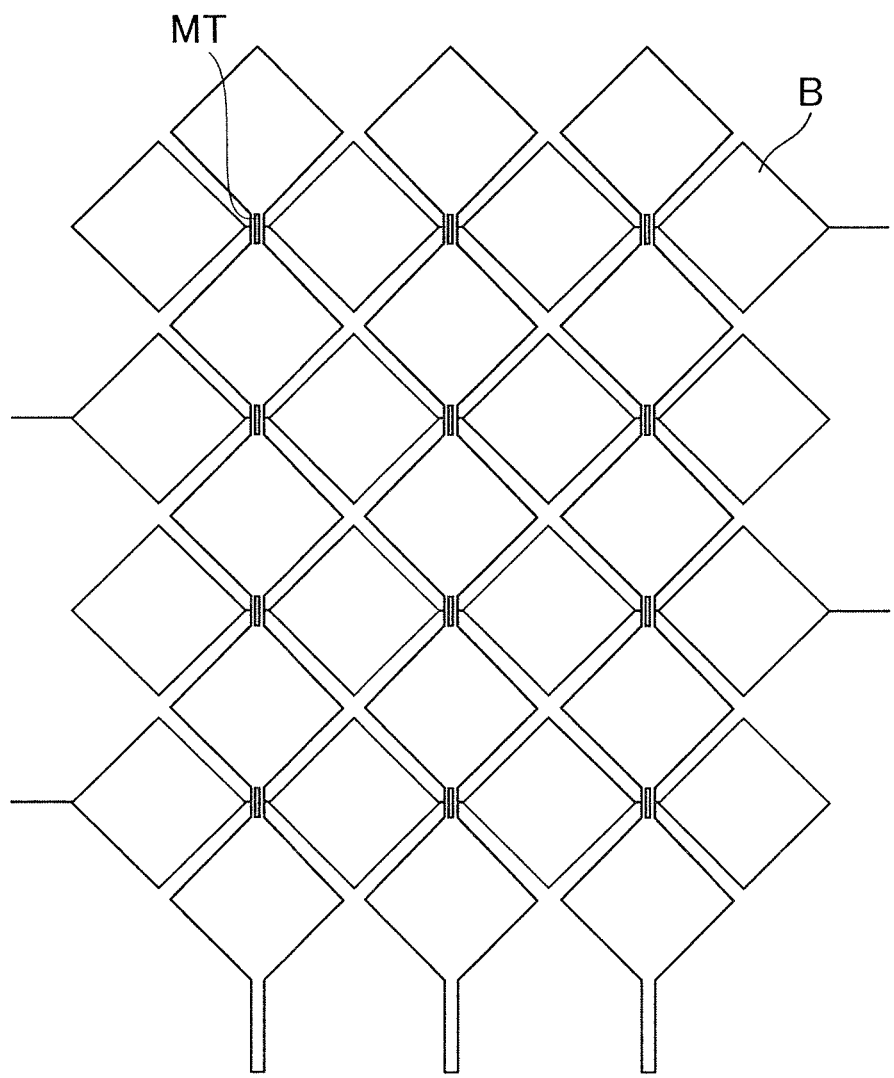
FIG. 15 is a view for explaining an X electrode of a touch panel according to an embodiment 6 of the present invention.

FIG. 15 is a view for explaining an X electrode of a touch panel according to an embodiment 6 of the present invention.

This embodiment is, as shown in FIG. 15, characterized in that the resistance of a fine line portion 1a of an X electrode remotest from a feeding end is lowered by laminating a metal layer MT to the fine line portion 1a. Due to such a constitution, compared to the previously-mentioned embodiment 4 shown in FIG. 12, a line width of the fine line portion 1a of the X electrode remotest from the feeding end can be made small and hence, it is possible to make the X electrodes and Y electrodes more difficult to be recognized by a user. Further, a size of the X electrode and a size of the Y electrode can be made uniform with each other and hence, linearity of the electrodes can be enhanced.

In the above-mentioned embodiment, although the resistance of the fine line portion 1a of the X electrode remotest from the feeding end is lowered by laminating the metal layer MT to the fine line portion 1a, the resistance of a fine line portion 2a of the Y electrode remotest from a feeding end may be lowered by laminating the metal layer MT to the fine line portion 2a.

In this embodiment, in place of lowering the resistance of the fine line portion 1a (or the fine line portion 2a) remotest from the feeding end by laminating the metal layer MT to the fine line portion 1a (or the fine line portion 2a) with respect to the X electrode (or the Y electrode), the resistance of the fine line portion 1a (or the fine line portion 2a) remotest from the feeding end may be lowered by increasing a film thickness of the fine line portion 1a (or the fine line portion 2a) remotest from the feeding end with respect to the X electrode (or the Y electrode). Also in this case, it is possible to make the X electrodes and the Y electrodes more difficult to be recognized by the user. Further, a size of the X electrode and a size of the Y electrode can be made uniform with each other and hence, linearity of the electrodes can be enhanced.

In FIG. 15, the metal layer MT is laminated to the fine line portion 1a (or the fine line portion 2a) remotest from the feeding end) with respect to the X electrode (or the Y electrode). However, the metal layer MT may be laminated to a plurality of the fine line portions 1a (or the fine line portions 2a) on a remote side remote from the feeding end in the X electrode (or Y electrode). In this case, the number of the fine line portions 1a (or the fine line portions 2a) on which the metal layer MT is laminated may be set such that a size of the X electrode and a size of the Y electrode become uniform.

Further, this embodiment is also applicable to a usual touch panel, that is, a touch panel where fine line portions 1a (or the fine line portions 2a) of the X electrodes (or the Y electrodes) have a uniform width.

Embodiment 7

Figure 16:
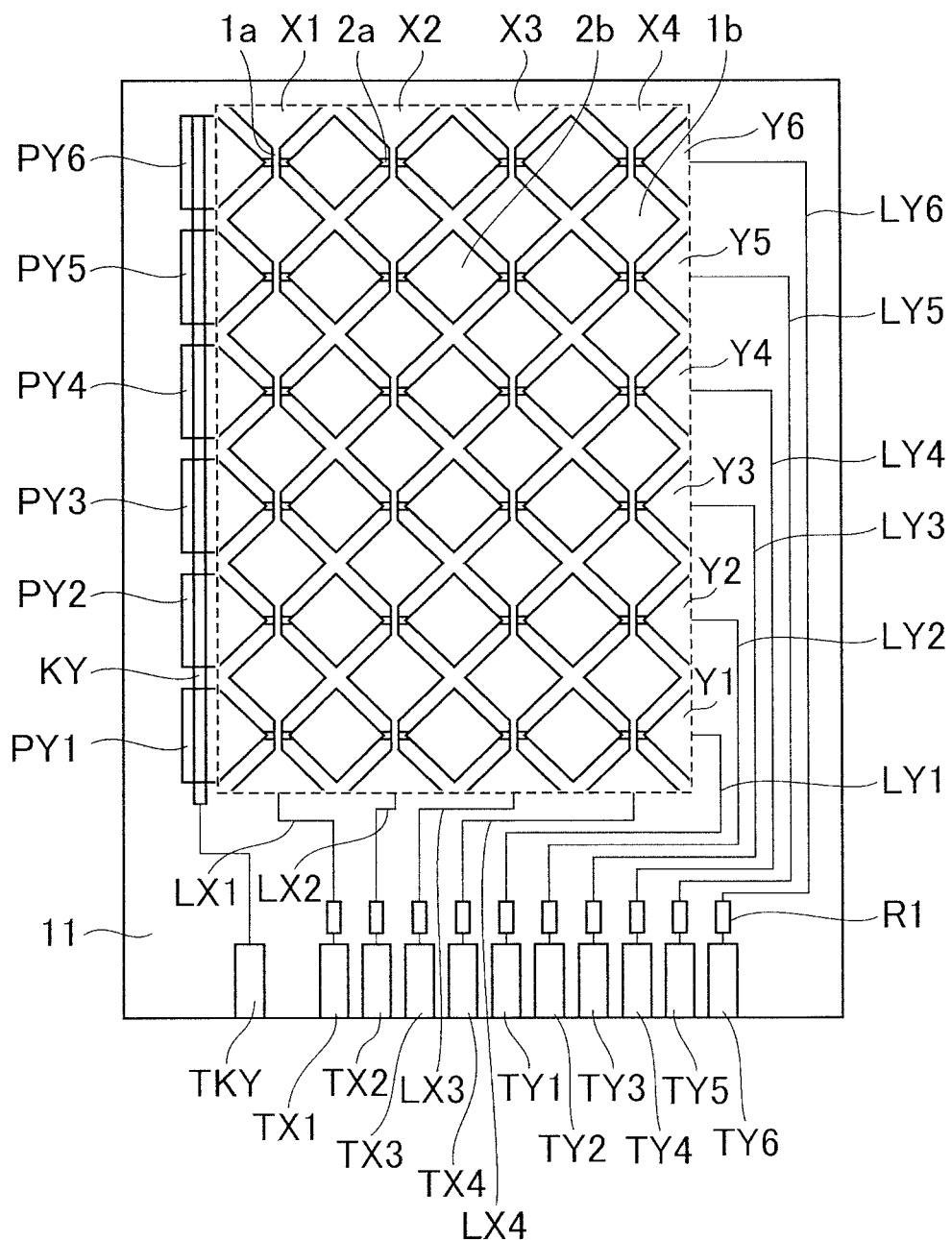
FIG. 16 is a view for explaining lead lines of a touch panel according to an embodiment 7 of the present invention.

FIG. 16 is a view for explaining lead lines of a touch panel according to an embodiment 7 of the present invention.

As shown in FIG. 16, this embodiment is characterized in that, the lead lines (LX1 to LX4, LY1 to LY6) are connected to resistances (R1) of 100 kΩ or more so as to prevent the appearance of irregularities in resistance value among X electrodes or irregularities in resistance value among Y electrodes within an effective touch region thus making a reaction value in response to a touch uniform within the effective touch region. Further, this embodiment can also cope with noises effectively.

In the touch panels of the above-mentioned embodiments 1 to 3, shapes of the pad portion 1b of the X electrode and the pad portion 2b of the Y electrode in a peripheral portion of the touch panel are set half of shapes of the pad portions in a center portion. As described previously, one of causes which bring about the fluctuation of a reaction value in response to a finger touch is that a load is increased at the remote end remote from the feeding end. In this respect, in the touch panels of the embodiments 1 to 3, the pad portions (1b, 2b) of the X electrode and the Y electrode remotest from the feeding end are set half of the pad portions in the center portion in shape and hence, the load is also halved approximately. Accordingly, the fine line portions (1a, 2a) or the pad portions (1b, 2b) to which the above-mentioned embodiments 4 to 7 are applied may be the fine line portions (1a, 2a) or the pad portions (1b, 2b) preceding to the fine line portions (1a, 2a) or the pad portions (1b, 2b) of the X electrode and the Y electrode remotest from the feeding end by one.

Further, the above-mentioned embodiments 4 to 7 are also applicable to the touch panel shown in FIG. 1 to FIG. 3, the touch panel shown in FIG. 4 to FIG. 6, and the touch panel shown in FIG. 8 to FIG. 10.

As described previously, the touch panel of the above-mentioned each embodiment is arranged on a display panel of a liquid crystal display device or an organic EL display device, and is used as a device for inputting information by performing a touch operation on a display screen with a finger of a user, a pen or the like.

Although the inventions which are made by inventors of the present invention have been specifically explained in conjunction with the embodiments, it is needless to say that the present invention is not limited to the above-mentioned embodiments and various modifications are conceivable without departing from the gist of the present invention.

What is claimed is:

1. An electrostatic capacitance type touch panel comprising:
    a substrate;
    a plurality of X electrodes which are formed over the substrate, the plurality of X electrodes extending in a second direction and being arranged in a first direction which intersects with the second direction; and
    a plurality of Y electrodes which are formed over the substrate, the plurality of Y electrodes extending in the first direction while intersecting with the X electrodes and being arranged in the second direction;
    a drive voltage being supplied to the plurality of Y electrodes from one side of the plurality of Y electrodes, wherein lead lines are connected to respective one-end portions of the Y electrodes,
    the Y electrodes being divided into a first group and a second group, and the lead lines which are connected to the respective one-end portions of the Y electrodes in the first group and the lead lines which are connected to the respective one-end portions of the Y electrodes in the second group are led out in directions different from each other so an effective touch region can be set uniform between a left side and a right side of the electrostatic capacitance type touch panel,
    the Y electrodes being placed inside the effective touch region, the first and second groups having extended inspection portions outside the effective touch region at respective other-end portions where the lead lines are not connected for inspecting electrical connections of the Y electrodes respectively,
    the touch panel further comprises outside the effective touch region a single continuous first inspection electrode which is laminated to and faces respective ones of the inspection portions in the first group with an insulation film sandwiched therebetween, and outside the effective touch region a single continuous second inspection electrode which is laminated to and faces respective ones of the inspection portions in the second group with an insulation film sandwiched therebetween, and
    a voltage for inspection is supplied to the first inspection electrode and the second inspection electrode and detected through the lead lines during an inspection time and a voltage at the same phase as the drive voltage supplied to the Y electrodes is supplied to the first inspection electrode and the second inspection electrode during a usual operation time.

2. The touch panel according to claim 1, wherein the respective X electrodes and the respective Y electrodes are formed by alternately arranging pad portions and fine line portions in an extending direction thereof respectively, the pad portions of the respective X electrodes and the pad portions of the respective Y electrodes are arranged without overlapping with each other as viewed in a plan view, and the fine line portions of the respective X electrodes and the fine line portions of the respective Y electrodes intersect with each other three-dimensionally, the pad portions and the fine line portions of the respective X electrodes and the pad portions of the respective Y electrodes are formed over the same layer, the fine line portions of the respective Y electrodes are formed below the pad portions of the respective Y electrodes, and are connected to the pad portions of the respective Y electrodes via contact holes formed in an insulation film interposed between the pad portions of the respective Y electrodes and the fine line portions of the respective Y electrodes, and the first inspection electrode and the second inspection electrode are formed over the same layer over which the fine line portions of the Y electrodes are formed.

3. The touch panel according to claim 1, wherein the respective X electrodes and the respective Y electrodes are formed by alternately arranging pad portions and fine line portions in an extending direction thereof respectively, the pad portions of the respective X electrodes and the pad portions of the respective Y electrodes are arranged without overlapping with each other as viewed in a plan view, and the fine line portions of the respective X electrodes and the fine line portions of the respective Y electrodes intersect with each other three-dimensionally, the pad portions and the fine line portions of the respective X electrodes and the pad portions of the respective Y electrodes are formed over the same layer, the fine line portions of the respective Y electrodes are formed above the pad portions of the respective Y electrodes, and are connected to the pad portions of the respective Y electrodes via contact holes formed in an insulation film interposed between the pad portions of the respective Y electrodes and the fine line portions of the respective Y electrodes, and the first inspection electrode and the second inspection electrode are formed over the same layer over which the fine line portions of the Y electrodes are formed.

4. The touch panel according to claim 1, wherein the respective X electrodes and the respective Y electrodes are formed by alternately arranging pad portions and fine line portions in an extending direction thereof respectively, the pad portions of the respective X electrodes and the pad portions of the respective Y electrodes are arranged without overlapping with each other as viewed in a plan view, and the fine line portions of the respective X electrodes and the fine line portions of the respective Y electrodes intersect with each other three-dimensionally, the X electrodes and the Y electrodes are formed over different layers with an insulation film sandwiched therebetween, and the X electrodes are formed below the Y electrodes, and the first inspection electrode and the second inspection electrode are formed between the layer over which the Y electrodes are formed and the layer over which the X electrodes are formed.

5. A display device comprising:

a display panel; and a touch panel which is arranged on a viewer's side of the display panel, wherein the touch panel is the touch panel according to claim 1.

* * * * *